United States Patent
Karppanen

(10) Patent No.: US 10,719,571 B2
(45) Date of Patent: *Jul. 21, 2020

(54) VIRTUALIZED RENDERING

(71) Applicant: Amazon Technologies, Inc., Reno, NV (US)

(72) Inventor: Jari Juhani Karppanen, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,210

(22) Filed: Oct. 8, 2018

(65) Prior Publication Data

US 2019/0087508 A1    Mar. 21, 2019

Related U.S. Application Data

(63) Continuation of application No. 14/979,299, filed on Dec. 22, 2015, now Pat. No. 10,095,669.

(51) Int. Cl.
*G06F 16/957* (2019.01)
(52) U.S. Cl.
CPC ................ *G06F 16/9577* (2019.01)
(58) Field of Classification Search
CPC .................................................... G06F 17/30
See application file for complete search history.

(56) References Cited

U.S. PATENT DOCUMENTS

| | | | |
|---|---|---|---|
| 2010/0146085 A1 | 6/2010 | Van Wie | |
| 2010/0268694 A1* | 10/2010 | Denoue et al. | G06F 17/30 |
| 2013/0100059 A1* | 4/2013 | Champion et al. | G06F 3/041 |
| 2013/0321399 A1 | 12/2013 | Rohlf | |

OTHER PUBLICATIONS

U.S. Non-Final Office Action dated Aug. 11, 2017 issued in U.S. Appl. No. 14/979,299.
U.S. Notice of Allowance dated Aug. 14, 2018 issued in U.S. Appl. No. 14/979,299.

* cited by examiner

*Primary Examiner* — James J Debrow
(74) *Attorney, Agent, or Firm* — Hogan Lovells US LLP

(57) ABSTRACT

Content rendered for display on a first client device can be referenced for similar pages to be displayed on other client devices such that similar content does not need to be re-rendered. Each client can have a respective virtual rendering engine on a host device, and the content rendered by those virtual engines can be mapped and used to generate content trees for different pages or other groupings of content. When a new page is to be rendered, the tiles or other portions matching previously-rendered tiles can be referenced, so that only new or unique portions need to be rendered for a particular page. The content can come from multiple locations as rendered by multiple virtual clients, such that for many clients the respective virtual engine may not render any content but instead reference rendered content from one or more locations as determined according to the page tree.

20 Claims, 5 Drawing Sheets

VIRTUALIZED RENDERING

CROSS REFERENCE TO RELATED APPLICATIONS

This is a continuation application of U.S. patent application Ser. No. 14/979,299, filed on Dec. 22, 2015, entitled "VIRTUALIZED RENDERING," which is hereby incorporated herein by reference in its entirety.

Users are increasingly turning to Internet-based applications and functionality to perform various tasks. For some of these applications the content served to each client has significant overlap, but conventional approaches still require a discrete rendering component re-rendering the content for each client. This duplication of work across potentially thousands of clients or more comes at a significant expense to the content provider, as a significant resource capacity may need to be purchased, operated, and maintained to provide the content across the various clients.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide content for display on multiple client devices. In particular, various embodiments provide for the reuse of already-rendered content in order to reduce the resource capacity needed to serve that content to multiple clients or other recipients. Approaches presented herein can virtualize the rendering engines for those clients on the server side so that, instead of having dedicated rendering engines or virtual machine instances, a rendering service can be utilized that provides the necessary rendering content using a plurality of thin clients and/or virtual rendering engines. A parent virtual rendering engine for a page can render a first instance of a page, which can include content for each tile (or at least tiles corresponding to a viewport on a corresponding client device) on the page. Subsequent requests for pages of content that include at least some of the same content can reference the appropriate tiles of the parent page instead of triggering a re-rendering those tiles. The tiles not available from the parent page can be obtained from another rendering engine, if available, or rendered on a virtual rendering engine for the respective client device. A page of content thus can have a tree or hierarchy of rendering engines at different levels, wherein the virtual rendering engine for a particular client can be a leaf node of the tree and can reference any content available along the respective branch of the tree.

Various other functions can be implemented within the various embodiments as well as discussed and suggested elsewhere herein.

Figure 1:
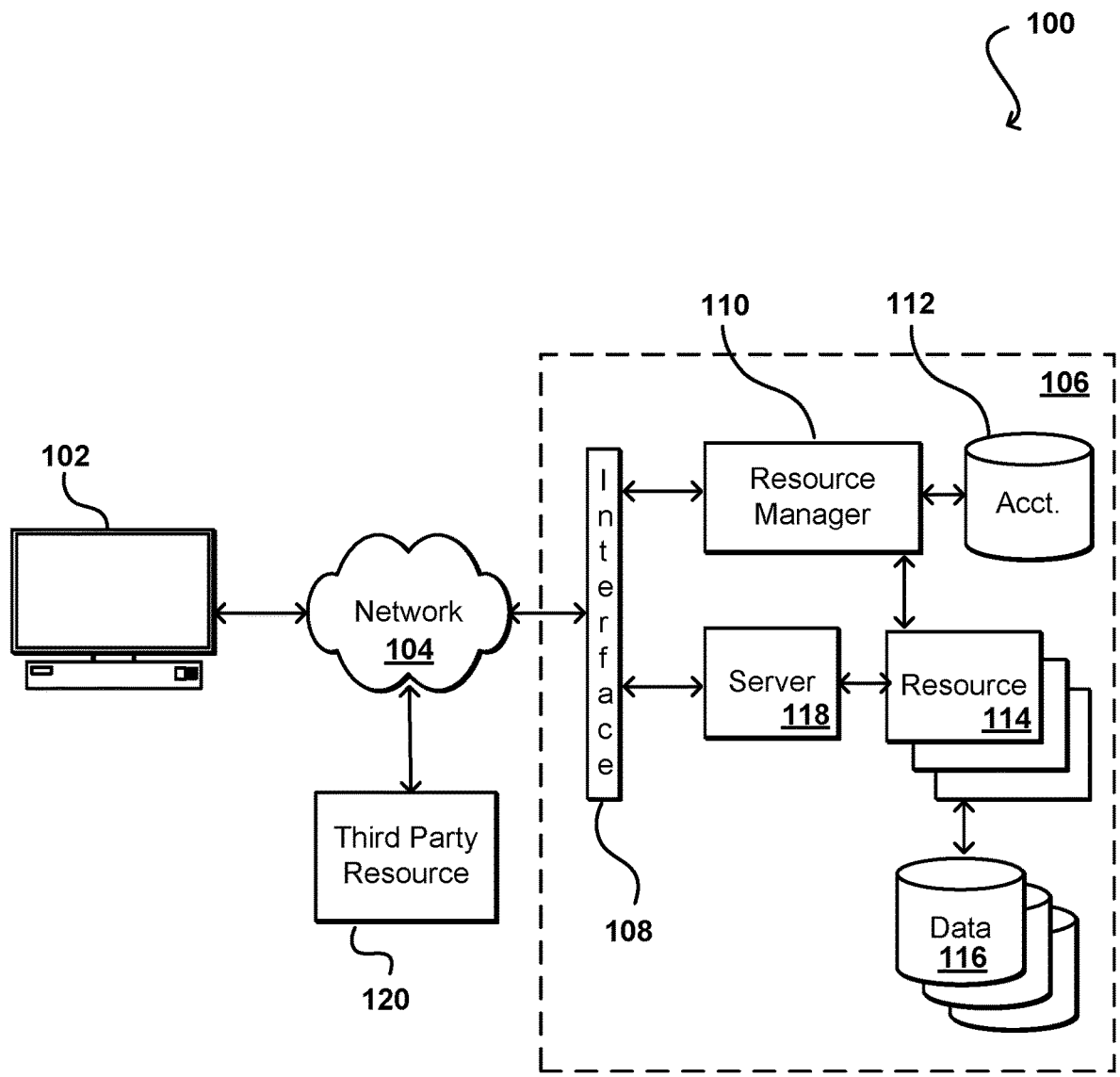
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment (or multi-tenant environment) is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. In some embodiments, at least one server 118 will sit between the client and the resources, in order to manage the resources and connections to, or communication with, those resources. While applications such as Web browsers executing on the client may frequently send a request to, and receive a response from, such a server 118, in some embodiments the client and server have a bidirectional longer-term connection, where the client sends updates related to touch gestures, mouse movement, and/or scrolling, for example, and the server sends back either graphical instructions to rasterize the content, texture data, or a combination of both. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, in embodiments that require such actions, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

In some embodiments is no necessity to authenticate a user or have an account. Both the server and client side instances of virtual rendering engines can be started anonymously. The interface layer can operate as a public API that enables communication between client and server component of a virtualized rendering engine. Instead of HTTP, it can utilize a custom protocol to transmit drawing instructions/commands and/or DOM branches (or a similar data structure) data between the client and server. Back-end resource management may be used when additional clients trigger the creation of additional virtual rendering engines, eventually overloading the server. When given performance metric thresholds are exceeded, the interface layer can direct incoming new client connections to other hosts, even if the backend has the needed content available.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

Figure 2A:
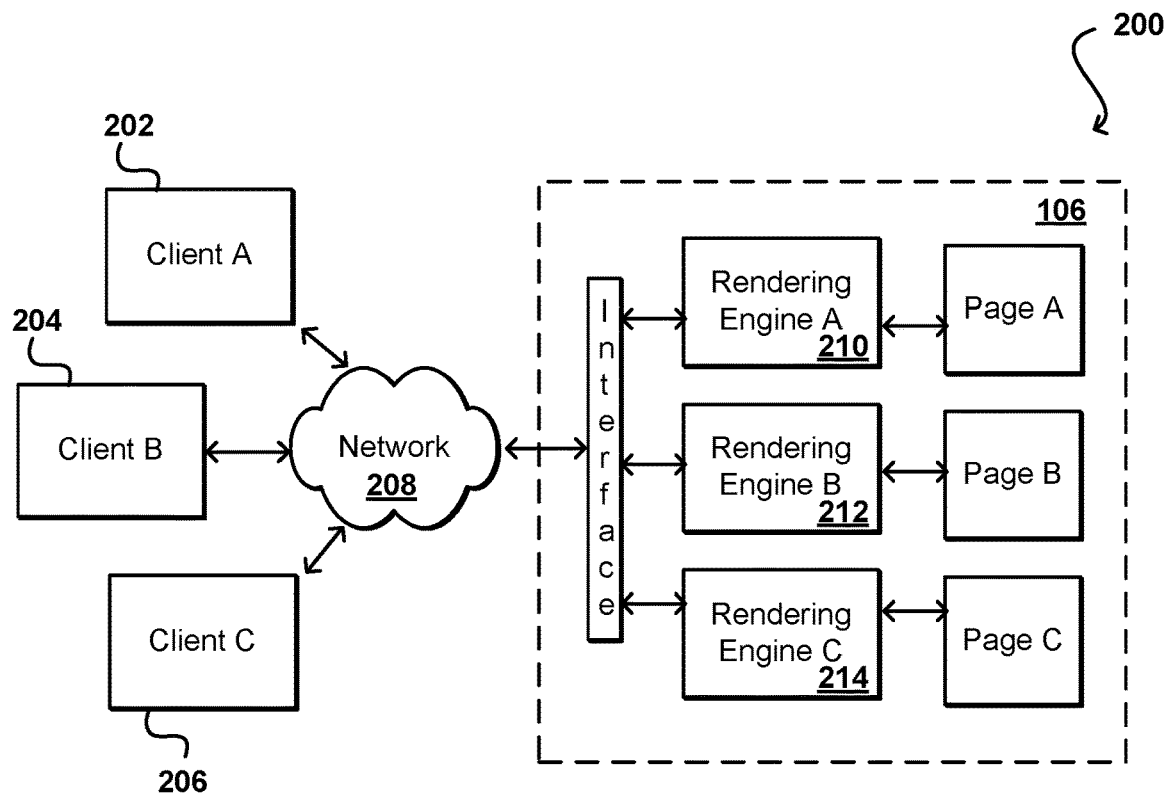
FIGS. 2A and 2B illustrate example approaches to rendering content to be provided to multiple clients that can be utilized in accordance with various embodiments.
Figure 2B:
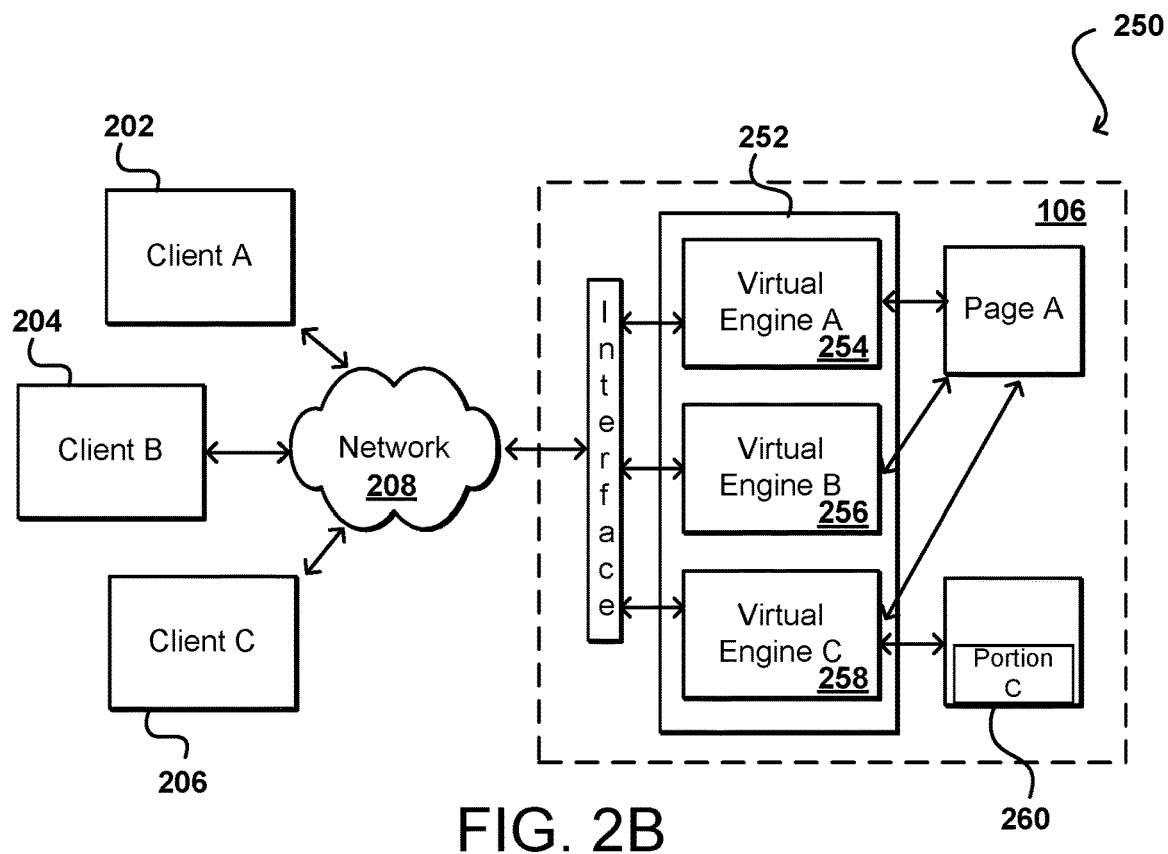

FIGS. 2A and 2B illustrate example approaches for rendering content for multiple clients that can be utilized in accordance with various embodiments. In the example situation 200 of FIG. 2A, three clients 202, 204, 206 are submitting requests for content across at least one network 208, such as the Internet or a cellular network, that are received to an interface layer of a resource provider environment 106. In this example, each client could be sending a request for content relating to a webpage provided by resources (e.g., servers) of the resource provider environment. As with conventional approaches, a respective rendering engine 210, 212, 214 will be generated or allocated to each of the clients 202, 204, 206 to generate a respective page of content to be provided for display on the respective client. For example, rendering engine A can render page A to be displayed on client A, rendering engine B can render page B to be displayed on client B, and so on. These rendering engines can be on the same server or different servers, among other such options. These rendering engines can also access content from one or more data sources within and/or external to the resource provider environment.

It may often be the case, however, that much of the content on at least some of the rendered pages will be the same. For example, the header and navigation options on a webpage might be the same for all users. As mentioned, however, causing each rendering engine to render a respective page for a respective client means that the rendering for this content is performed at least once for each client requesting the content. This requires significant processing capacity, and thus comes at a substantial cost to the provider which is then passed on to customers. Further, the need to fully render each copy of a page can increase latency for customers and requires additional resource management, among other such issues.

Accordingly, approaches in accordance with various embodiments attempt to minimize redundant rendering by enabling rendered portions to be shared among rendering engines, such that a rendered piece of content can be referenced by other rendering engines without the need to re-render the same piece of content. Various approaches can also utilize a virtualized rendering engine scheme wherein a large number of virtual instances, or virtual machines, can be backed by a much smaller number of parent or parent virtual instances in a rendering engine hierarchy. Such a hierarchy can have a tree structure, or similar hierarchical structure with multiple levels of nodes, wherein a given page can be rendered for a customer by traversing the appropriate path and referencing portions of the page that have already been rendered by a node along the path. Each child rendering instance, or node along the path, can maintain its own unique state information and can render one or more portions of the page that are unique to the particular page, or that at least do not have an existing rendering from another engine. Such an approach enables content to be rendered once and shared as appropriate, with additional renderings being generated primarily in response to a change in the state of the content or other such change.

Each virtual child instance in some embodiments will maintain its own viewport and scrolling-related prediction statistics, such as how likely an area of the content is to become visible for that specific virtual instance within a given period of time. Such prediction statistics can be applied from all related client instances to compute a weighted average of the probability of given content (i.e., a tile) becoming visible, and high-probability content can be predictively rasterized without any virtual client having the area visible yet. When a portion of a page has not yet been rendered, it can be rendered by a root renderer for that DOM branch (as there are no conflicts). Each forked portion/tile of content can maintain a copy of, or pointer to, the actual backing texture identifier/handle, eliminating the need to traverse the node tree when compositing the final image. For each frame or screen refresh, the renderer node tree can be traversed from the root and "dirty" portions are put into a rendering dependency graph. When similar portions/tiles for "forked" child renderers are rasterized, all related portions can be processed in sequence to enable sharing the same source resources. When drawing, the entire tree can first be traversed to generate a master rasterization task dependency graph in some embodiments.

FIG. 2B illustrates an example situation 250 wherein the three clients 202, 204, 206 are again requesting pages with at least some overlapping content. In this case, however, the content is provided using a set of virtual rendering engines 254, 256, 258 that can run on a single host 252, or set of hosts, within the scope of the various embodiments. In this example, rendering engine A 254 will act as a parent rendering engine for the page, having rendered Page A, a first copy of the current state of the page. This can be, for example, a landing page or home page that may be substantially similar, or even the same, for multiple users or clients. In this example, Page B to be provide to client B is the same as Page A. Thus, virtual rendering engine B 252 can function as a child virtual rendering engine to virtual engine A, and reference the page of content rendered by virtual engine A 254. Page C, which is to be provided to client C 206, may contain some of the same content as is contained in Page A, but may also include at least one distinct portion 260 that is different from the content on Page A. Accordingly, virtual engine C 258 can act as a child engine to virtual engine A 254, and can reference that portion of content that was rendered for Page A and is also contained in Page C. Virtual engine C can also render the portion 260 that is unique to Page C. Any other child virtual engine subsequently using the same portion can reference the content portion 260 rendered by virtual engine C 258. While a small number of virtual engines at a small number of hierarchical levels is displayed in this example, it should be understood that there can be various numbers of engines and levels, and that each separate page or version of a page can have a unique rendering within the scope of the various embodiments.

Figure 3:
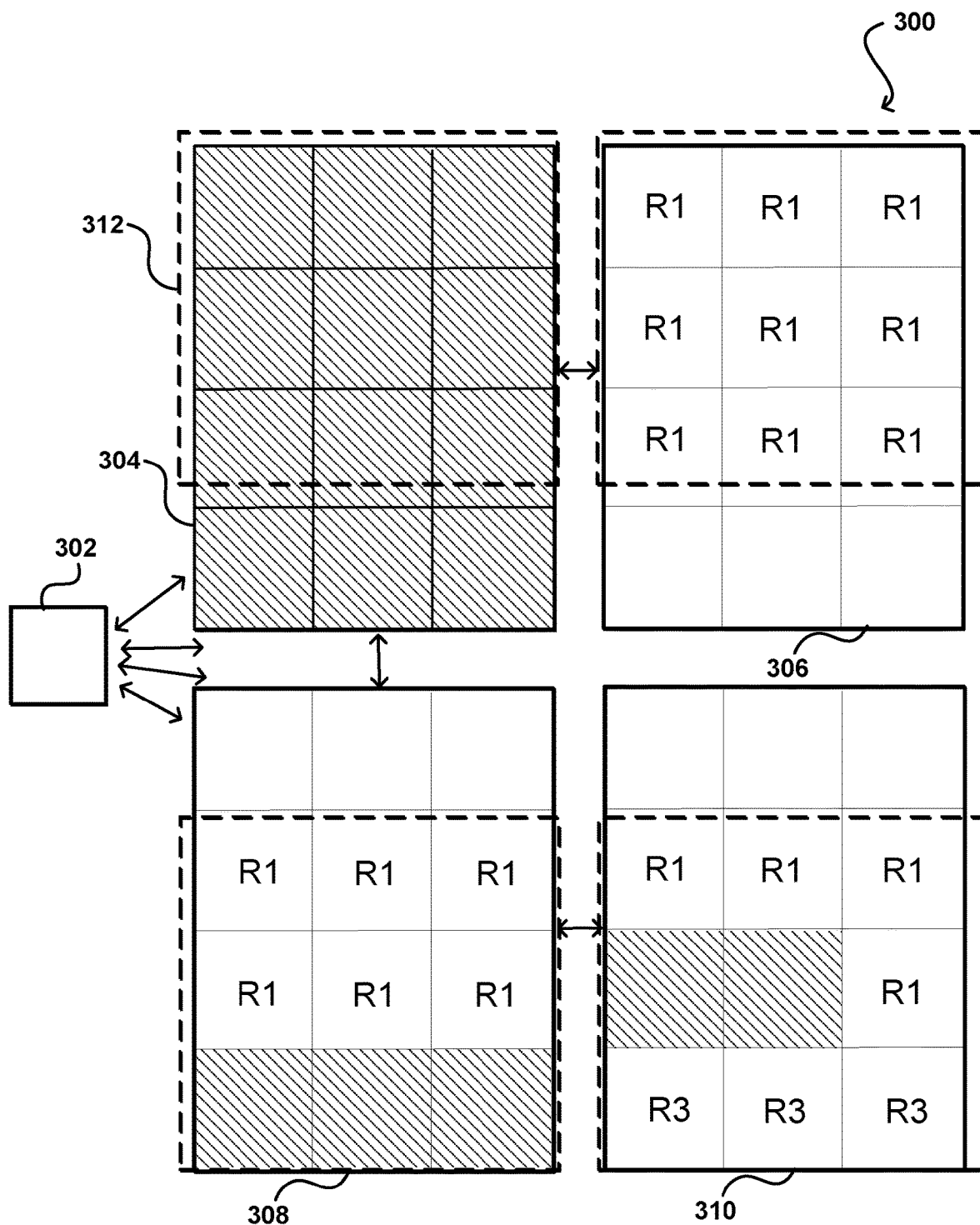
FIG. 3 illustrates an example tiling approach wherein different rendering components can provide content for different tiles of a set of pages that can be utilized in accordance with various embodiments.

FIG. 3 shows a specific example situation 300 wherein four versions of a page of content are to be rendered for four different clients. It should be understood that although "page" is used for purposes of explanation, any file, document, or other grouping of content can be used as well within the scope of the various embodiments. Further, it should be understood that the content can be displayed in a browser or other appropriate application or interface executing or presented on a respective computing device. The rendering is done on a remote server in at least some embodiments, while in other embodiments at least some of the rendering can be performed on the client device or other appropriate system or service.

In this example, an endpoint 302 of the content provider environment receives a request and directs the request, or information for the request, to a virtual rendering engine. In this example, a current version of a page is going through a first rendering, such that a full first page 304 is rendered by a respective virtual rendering engine, which for explanation purposes will be referred to as a parent engine, although the engine will function as any other virtual rendering engine of the system and only function as a "parent" if referenced by a child rendering engine. The endpoint 302 can manage, or at least have access to, the tree structure for the page, such that incoming requests can be directed as appropriate. In other embodiments requests can be directed down the tree in order to enable as much previously rendered content to be referenced as possible.

It should be noted that a rendering engine in at least some embodiments will not rasterize the entire page without anyone asking for the content area; when the first client connects, the server loads and parses the page, constructing a DOM tree, and rasterizes only the visible portion of the page plus possibly some predictive area around the visible viewport. When another client connects and requests the same URL with similar query string, a virtual rendering engine instance is created, the second engine will also load the page and create a DOM that is then "merged" to the existing instance by using DOM node objects that refer to another DOM tree. As an optimization, if the request and query string are identical and there are no session cookies, or the rendering engine otherwise determines the content would be identical or nearly identical, it could skip the page load and just directly "fork" from the existing DOM. The initial chosen parent and rendering engine may not be the root, and instead could be some child and rendering engine based on the query string. The DOM merge would be done only for that tree level in at least some embodiments. A new virtual renderer will not directly attempt to use rasterization tiles from its grandparents by directly referring to grandparent DOM nodes.

In this example, the entire first page 304 is rendered by the respective parent engine. The page in this example is composed of a set of "tiles," or other portions or subsets of the page to be displayed. The parent engine can render the content for all tiles of the page, and these tiles can be referenced by various child engines as appropriate. In at least some cases the size of the page may make it such that only a portion of the page can be displayed and/or viewable on a client device at any time. The portion can vary based upon factors such as the size and resolution of the display screen, the orientation of the device, a zoom level for the content, a font size of the content, or other such factors. The currently viewable portion of the page on the client device can be represented by a virtual viewport 312, which in at least some embodiments is represented by a set of screen or page coordinates. As illustrated in this example, even though there are twelve tiles of the page, only nine of the tiles have a portion currently viewable on the device as represented by the viewport 312. In some embodiments only tiles that are at least partially contained within the viewport are rendered by the respective virtual engine. In this figure, all areas that are uniquely rendered for a page are shaded using diagonal lines.

A second page 306 is to be provided for a second client. Using a conventional approach, a second full rendering of the page would be created. In this example, the second page 306 is identical to the first page 304, at least for those tiles contained within the viewport for the second page. Accordingly, the second virtual rendering engine, or child engine, can include references for each of those tiles to the corresponding tiles of the first page, with those references on this page each designated by R1. Since the tiles have all previously been rendered and are available, the child engine can simply reference those existing tiles without having to do any additional rendering. These references can then be used as are references for any other resource and used to obtain content for the page to be displayed.

A third page 308 is to be provided for a third client. In this example, the viewport is in a different location with respect to the page, such that only six of the tiles are the same as in the second page 306, and those tiles are also the same in the first page. Accordingly, the third page can use references to the corresponding tiles of the first page, either directly or through the second page. Further, a set of three tiles towards the bottom of the viewport are unique to the third page. This can result from, for example, a different advertisement or recommendation being displayed, a different search result, content specific to a user of the third client device, or any other appropriate reason. Accordingly, the third rendering engine can render the new or unique tiles for the third page, and can include references to the first page for those tiles previously rendered. Depending at least in part upon the renderer (i.e., first or second) that was selected as the parent when analyzing the connect request, the reference will be through that instance. The mapping to the identical tile can be performed through DOM mapping: when the underlying DOM is visually equivalent, the rendering engine will assume that the tile output will be identical, too. When a tile overlaps multiple layers of content, it's possible that a subset of the layers are identical, even though if the composited output is not. When considering output, the tiling is not a simple grid, but can consist of multiple layers, and some of those layers can be virtual through references to parent renderer, and some composited pieces of tile (other layers) come from the leaf virtual engine itself.

A fourth page 310 is to be provided for a fourth client. As clients can be applications or interfaces in at least some embodiments, it should be understood that in some embodiments two or more clients may run on the same device or be associated with the same user, among other such options. In this example, there are again nine tiles available through the viewport, although the viewport can have various other sizes, shapes, and locations as discussed elsewhere herein. In this example there are tiles that are the same as the parent page, and those tiles can include references R1 to the corresponding tiles of the first page. There are also tiles that are the same as the third page, and those tiles can include references R3 to the corresponding tiles of the third page. There also can be tiles that, at least in this example are unique to the fourth page, such that the fourth rendering engine can render those tiles to be displayed on the fourth device. The fourth page can thus inherit links to the first page from the third page in at least some embodiments. The fourth page in this example would be under the third page in the page hierarchy, which would be under the first page or root of the tree. The new portion in this example could correspond to content such as an advertisement. Since there are a limited number of advertisements, for large numbers of users there is a good chance that this ad will be displayed to other clients such that the ad can be made available for reference by other virtual engines. In at least some embodiments the endpoint 302 can proxy all communication to the various child engines for the various resources.

When a client submits a request for content in one embodiment, the same parent rendering engine can be used as was used for a previous request for that content. If some portion of the content differs from the previous rendering, the resource can be forked and the portion(s) different from that provided by the first client can be provided using a different resource, such as a child rendering engine. The resources can be shared as appropriate. Various animations, images, and other content can be shared, and the sharing can utilize a reference clock that can be used to determine the deadline for completing the next frame. Several clients can thus utilize the same reference clock but for the same or different content. An image rasterized by a first host can be sent to a second host using an appropriate backend protocol. The client in this example would do minimal processing or rendering, and would primarily display content sent by the relevant host. A client can receive content from multiple different hosts, however, and is not tied to a single endpoint. Initially a client can contact one endpoint, and the corresponding server can instruct the client accordingly. If the client wants to load a webpage into a browser, the browser can contact the backend service and a request can be submitted that indicates the particular page to be displayed. Instead of sending an HTTP request as in conventional approaches, the request can be sent to the backend components. The server can send instructions to the client as to how to draw the appropriate frame. Along with that, if there are resources that are distributed to other hosts, the server can send a reference to the other resource(s) instead of the actual resource. The client in this example would then contact the identified host(s) and ask for the particular resource. These hosts can provide the client with the resources needed for the page. If a third host is needed to provide a resource, either the first host or the second host could provide the reference, which in some embodiments can direct the client back to the first host. The client has little intelligence in this example, and primarily displays content in the appropriate tiles, layers, or other sectionings per the instructions received from the respective host(s). The first host contacted could thus have the bulk content for the page, and for the other content the host can fork out to one or more child rendering engines that reference the content from the first rendering engine has provide at least one additional portion or resource. The communication from the client would then be with the child instance for that portion, with the client having multiple connections to multiple instances.

If a client connects using same request data as previous clients, without the server doing a new page load, the same parent rendering engine can be used as-is (nothing can be different). There can be a time threshold as to how often the parent renderer polls for the source web server for page updates, and if new clients connect within the threshold, the renderer can assume the page has not changed and serve the same content. Resource sharing can occur by keeping a list of referees in the resource containers. If a child renderer crashes, having the "reverse links" (i.e., who uses the resources) allows dropping the references, preventing leaks.

The reference clock can be shared between the entire tree of renderers. Due to rendering starting from root, the rendering engines closer to root will finish up their rasterization first. The clock is used to decide when a frame deadline occurs. When starting to rasterize the next frame, a frame sequence ordinal will be chosen. When a parent renderer has completed rasterizing all of its tiles, it will be able to start rasterizing the next frame even before all the child renderers have completed their tasks for the preceding frame. The tile rasterization can occur as a "wave" starting from the root, and there can be multiple "waves" in progress at once. If a parent renderer completes a frame and its child is behind by two frames, the child will be allowed to complete its frame but it will skip a number of following frames to catch up with the parent.

With respect to receiving content from other endpoints, the existing connection protocol that is used to transmit rasterization instructions or texture data can include a reference to a resource elsewhere. This can occur instead of containing the actual resource data. In such cases the client can open another connection to the specified host to retrieve the resource using the token given in the protocol message. This can occur in some embodiments when the load on one host exceeds a threshold and some or all of the renderers are cloned to another host, or when the host is being shut down gracefully (and replaced with another; migrate the data), or when multiple backend servers are used as helpers to separately process expensive resources. As an example, a WebGL animation can be rasterized by a backend "slave," auxiliary service, or child engine.

As mentioned, each virtual rendering engine can maintain its own information useful in rendering the appropriate content. As mentioned, this can include viewport information about the portion of the page that is, or would be, displayed on the respective device. The virtual instance can also maintain information with respect to event history (i.e., actions taken on the page), form data, user preferences, and the like. The instance an also maintain information about differences with respect to the parent page, as may be represented in a document object model (DOM) or other representation of the page. In some instances, or for some applications, current content may be required, such that a new rendering should be generated regardless of the availability of previous renderings. In cases where slightly out-of-date content may be acceptable, a rendering engine can attempt to reference at least some previously-rendered content if available, and in some embodiments can attempt to reference as much previously-rendered content as possible. A large number of virtual clients in the resource provider environment (or content provider environment, etc.) can then attempt to construct virtual rendering engines that share the same backing engine, or smaller set of backing engines. As mentioned, the DOM trees for these instances can be mapped back to the backing engine in such a way that non-identical nodes are held privately by the child virtual instances that form the "branches" of the page tree. As mentioned, there can be multiple levels of virtualization within the page tree, with each level referencing the previous level. For example, ninety child engines could share the base version of the page as is. Eight engines could use a common derived branch version of the base page utilizing 75% of the tiles from the parent engine. One engine could use a further derived version combining tiles from two parents, and one engine could use a different branch version of base page, among other such options.

In at least some embodiments, a child will always manage the "de-duplication" with its direct parent; from child's point of view, parents DOM nodes are all "real," and for duplicate content it will refer to its direct parent. Sharing a tile with a grandparent happens implicitly due to the grandparent first drawing its output, then the parent "completing" it's no-op drawing task, later leading to another no-op drawing for the child. The tile objects will hold a handle/pointer to a texture object that is the same for all renderers, while the parent/child relationship is handled by another pointer, whereby two trees are essentially merged into one.

When rendering content, the parent instance can render multiple locations of the page for each frame buffer update, depending on demand in at least some embodiments. The parent instance can also distribute different areas of content to relevant clients, such as where the first half of a page would be sent to clients A, B, and C, but the second half would only be sent to clients A and C. In addition, client C having slightly different content can render and overlay its differing content on top of the content from parent instance in some embodiments. This can include, for example, clipping regions transmitting serialized OpenGL drawing instructions from the parent, among other such options. A client D could also be viewing the very end of the page, in which case the parent instance could render viewports from the top and bottom, and instance C would render its own differing parts.

In some embodiments, the DOM trees can share the same memory space and be merged together using relative link data structures that may be more complex than for a simple parent/child relationship. For example, there could be a number of parallel child or parent links, associated with unique instance identifiers that are chosen so that various bit-masks can be used to test whether a link exists for a given instance. This can be done without having to iterate through all the links. A hash lookup table can be used to get the actual link if one is available. A virtual instance can also use memory addresses (i.e., pointers) as hash keys for tasks such as to check whether a node in a given address has instance-specific links.

In some embodiments, the drawing commands for most recent frame can be cached, such that the commands are ready for any new clients connecting. A child virtual instance can be on the remote device itself, handling light differential rendering tasks such as blinking cursors or client-specific popup windows. The parent instance, and potentially a number of child engines, can be kept alive for short times even without clients. Whenever a client connects, the content can be readily available, including both serialized drawing commands and serialized page content, avoiding having to re-load the originating page.

The virtualization in some embodiments can be done at the rendering tile level as discussed previously. As mentioned, tiles may be used for particular browsers or implementations but other groupings or sectionings of content can be used as well within the scope of the various embodiments. Some of the tiles can be drawn on the remote client and some on the server. For very long pages or nested pages, as may utilize iframes, multiple parent engines can host parts of the page by having identical synchronized copies of the DOM, and with each rendering a window within the page. Since content can consist of layers, an area of output frame can be composited from sectionings generated by different rendering engines. When a new virtual engine is created for a client, the server can send out-of-band packets of DOM data, eventually transmitting the required state to the remote engine so the remote engine can detach from the parent rendering engine, if required. Such an approach can enable a fast server instance to render the initial view in all cases, but if a client views pages and/or viewports that nobody else is viewing, or there is a network disconnect, for example, a client could be isolated or forked in order to recover and/or more optimally redistribute the resources of the parent instance.

In one embodiment there could be 10,000 server-side virtual rendering engines backed by a single server-side parent that has the entire page area rendered, drawn, and/or cached in memory for each frame. This can be mapped by 10,000 virtual rendering engines sending differences (or "diffs") to tile rendering instructions of various parts of the page to remote clients, although in some embodiments the backing instance can send the instructions directly to virtual instances on the remote devices.

In order to improve scalability, multiple physical auxiliary servers can be used to serve texture and/or bitmap data, which can assist the main backing instance. The main backing instance might be sending only serialized drawing commands that refer to those texture resources. In some embodiments, partially rendered tiles could be served from an intermediary backing engine, such that child engines can use those tiles as surfaces to further draw their own content. In such cases, drawing can refer to the generating a list of appended drawing instructions, without actually generating any final bitmaps. The generation of the final bitmaps could be delegated to a GPU of the client device, or another such resource. A backing rendering engine could also serialize its data when shutting down, allowing for a fast recovery as well as migration or cloning to other physical servers. A crawler service could also pre-emptively generate the state data, such as by loading and rendering the page without any virtual rendering engines.

If the parent rendering engine for a page changes a tile, that change can be propagated to the various child rendering engines as appropriate. A mapping service or other component can maintain a mapping in memory of the various tile structure and locations. Basic mapping and tracking protocols can be used to track the addresses of the various resources, such as for conventional content. When a page is initially loaded, the browser can request that the existing host running virtualized engines return its own piece of content. The hosts are independent, and main thing to worry about is whether a particular host crashes or otherwise becomes unavailable. A heartbeat scheme can be implemented in at least some embodiments. If particular resource is not available then that resource portion might timeout or fail in some embodiments. In some embodiments, an output frame can be composited with some sectionings missing, with unavailable regions replaced with generic placeholder content indicating content will be drawn soon.

In at least some embodiments, each client will have a respective virtual rendering engine client. That client may not have any content of its own, but can have a thin layer that owns the connection and manages aspects such as drawing position and user action history. On the server side the can be thousands of clients contacting a single host, and within that host there might be a corresponding number of thin clients or child rendering engines, most of which will not have their own content but will point to one or more other resources. Such an approach can also help to have an entire rendered page available instead of just the visible part as in conventional approaches, which can also improve performance by reducing latency upon a navigation action or change in viewable area of the page. The thin client layer on the server side, for a particular client on the user side, can have its own copy of the grid and can attempt to fill the grid with content. The thin client layer, or child rendering engine, can request resources from the parent or parent engine by referring to the content that already exists. If the content does not exist then the child rendering engine can draw its own tile. Such an approach can be used for various types of content that require rendering, such as images, video, games, formatted text, and the like.

Figure 4:
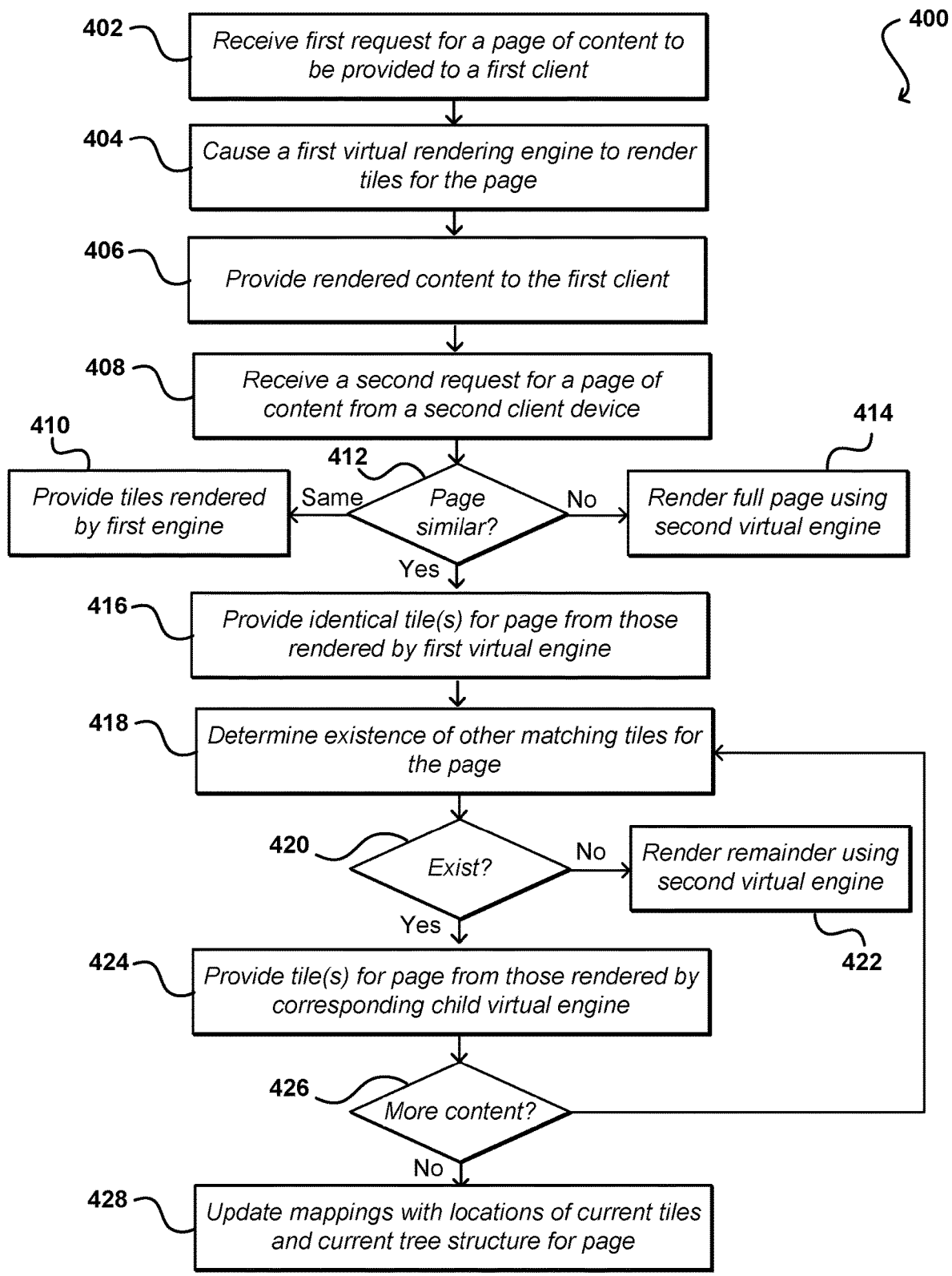
FIG. 4 illustrates an example process for rendering content for display on client devices that can be utilized in accordance with various embodiments.

FIG. 4 illustrates an example process 400 for providing content to be displayed by a client device that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a first request is received 402 for a page of content to be provided to a first client. While "page" is used in this example, it should be understood that any other collection, grouping, or layout of content can be used as well within the scope of the various embodiments as discussed elsewhere herein. Further, while Web-based content is discussed in various embodiments, it should be understood that any other type of rendered content available from any of a variety of types of sources can be used as well within the scope of the various embodiments. When the request is received, and in this example this is the first request for this particular page of content, or current version of this page of content, a determination can be made to cause 404 a first virtual rendering engine to render the appropriate tiles (or other sections or portion) of the page. As mentioned, the tiles can include any renderable content such as images, animations, formatted text, and the like. The content once rendered can then be provided 406 to the first client for display (or other presentation) via the first client device.

Subsequently, a second request for a page of content can be received 408 from a second client device. As mentioned, the request in some embodiments can be received to a single endpoint, such as a receiving component for a host device, that is able to distribute the request as appropriate to one or more virtual clients or virtual rendering engines operating on the host device or other host devices, among other such options. A determination can be made 410 as to whether the page is the same or similar to a page with an existing rendering, or is completely different (i.e., shares no tiles in common) from an existing rendering. If the page is the same as the page provided to the first client, a second virtual engine can reference the tiles rendered by the first engine such that the already-rendered tiles can be provided 412 to the second client without re-rendering those tiles. If, on the other hand, the page is completely different from any existing renderings, or a current version is required and a slightly out-of-date page will not suffice, the tiles for the page (either the full page or as correspond to a viewport, etc.) can be rendered 414 using a second virtual engine corresponding to the second client. These tiles can then be provided to the second client from the second virtual engine.

If only a portion, or subset, of the second page is identical to the first page, then the identical tiles rendered by the first virtual engine can be provided 416 to the second client for display as part of the second page. This can include, for example, establishing a first connection to the first virtual engine for receiving the tiles from the first page or receiving references from the second virtual engine that enable those tiles to be acquired by the second client, among other such options. A determination can also be made 418 as to whether there are additional matching tiles for the second page that have been rendered by a different virtual engine. If not, the remainder of the page (i.e., any remaining tiles) can be rendered 422 by the second virtual engine. If additional matching tiles are determined to exist 420, the tiles from a particular child virtual engine can be provided 424 to the second client. As mentioned previously, this can include going down a branch of the hierarchical page for the tree to the next virtual engine and sending one or more tiles that are appropriate for the page, such as by providing references from which the content can be obtained. Another determination can be made 426 as to whether there is additional content (i.e., more tiles) for the second page. If so, the process can continue whereby the tiles are rendered if they are unable to be obtained from another child virtual engine in the environment. If all the content for the page has been obtained, the page can be displayed or otherwise presented on the second client device and the mappings for the page tree can be updated 428 as appropriate, such as by adding, removing, or changing branches on the tree or storing new locations of tile or resource data accessible by client devices or child rendering engines, among other such resources.

Figure 5:
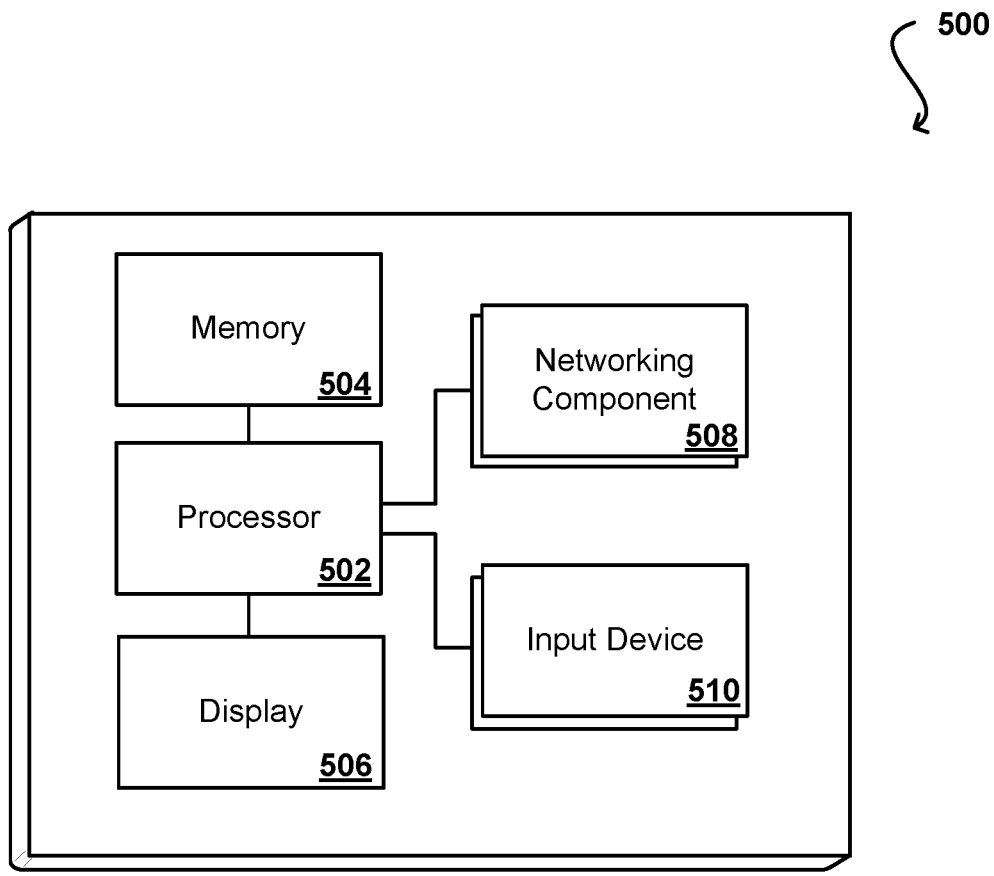
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a first request for a first page of content to be provided to a first client device;
rendering, using a first virtual rendering engine, the first page of content, the first page of content including a first plurality of tiles, wherein the first plurality of tiles include rendered content;
providing, to the first client device, the first page of content as rendered by the first virtual rendering engine;
receiving a second request for a second page of content to be provided to a second client device, the second page of content including a second plurality of tiles, a first subset of the second plurality of tiles including the same content as a subset of the first plurality of tiles of the first page of content;
causing the content for the first subset of the second plurality of tiles to be provided to the second client device based on the respective rendered content rendered by the first virtual rendering engine for the subset of the first plurality of tiles of the first page of content;
rendering, using a second virtual rendering engine, respective rendered content for a remaining subset of the second plurality of tiles;
providing respective rendered content for the remaining subset of the second plurality of tiles to the second client device.

2. The computer-implemented method of claim 1, further comprising:
updating a tree structure for the first page of content and the second page of content, wherein the first page of content is a parent page of the tree structure and the second page of content is a child page of the tree structure, the child page including references to the same rendered content of the parent page and identifying different content stored for the child page and rendered by the second virtual rendering engine.

3. The computer-implemented method of claim 1, further comprising:
receiving a third request for a third page of content to be provided to a third client device, the third page of content including a third plurality of tiles, content for the third plurality of tiles of the third page of content being to the same as the respective rendered content for the first plurality of tiles of the first page of content; and
causing the content for the third plurality of tiles to be provided to the third client device using the respective rendered content rendered by the first virtual rendering engine for the first plurality of tiles of the first page of content, wherein a third virtual rendering engine for the third page of content references the first plurality of tiles of the first page of content and does not render content for the third page of content.

4. The computer-implemented method of claim 3, further comprising:
determining a respective source of content for each tile to be rendered for a respective page based at least in part upon one or more parent pages for the respective page.

5. A computer-implemented method, comprising:
receiving a request for content to be transmitted to a client device;
determining that a first subset of the content has been rendered by a parent virtual rendering engine;
providing the first subset of the content to the client device as rendered by the parent virtual rendering engine;
determining that a second subset of the content has yet to be rendered;
causing a child virtual engine to render the second subset of the content;
providing the second subset of the content to the client device as rendered by the child virtual rendering engine.

6. The computer-implemented method of claim 5, further comprising:
maintaining a tree structure for a page including the content, the tree structure indicating the parent virtual rendering engine as a parent node associated with primary content for the page, the child virtual rendering engine as a child node associated with unique content for the second subset of the page provided to the client device, and location information for the first and second subsets as rendered by the first and second virtual rendering engines.

7. The computer-implemented method of claim 6, further comprising:
receiving a subsequent request for the page, the subsequent request associated with a second client device and causing different content to be included for a second portion of the page;
referencing a first portion of the content already rendered by at least one of the parent virtual rendering engine or the child virtual rendering engine according to the tree structure, wherein the first portion does not need to be re-rendered for the second client device; and
rendering the second portion of the content using a dedicated virtual rendering engine for the second client device.

8. The computer-implemented method of claim 6, further comprising:
maintaining a mapping of content for each tile of a set of tiles of the page.

9. The computer-implemented method of claim 6, wherein the parent virtual rendering engine is a backing rendering engine for a plurality of child virtual rendering engines, the child rendering engines configured to reference content rendered by the backing rendering engine.

10. The computer-implemented method of claim 9, wherein each child virtual rendering engine maintains state information for a respective client device.

11. The computer-implemented method of claim 9, wherein the state information includes at least one of viewport coordinates, user activity history, client device configuration, zoom level, client device orientation, form data, and user preferences.

12. The computer-implemented method of claim 5, further comprising:
directing communication from a plurality of client devices through a service endpoint configured to function as a proxy for the virtual rendering engines and establish connections between the client devices and the virtual rendering engines.

13. The computer-implemented method of claim 5, further comprising:
determining that a new version of the content rendered by the parent virtual rendering engine is to be rendered;
causing the new version of the content to be rendered by the parent virtual rendering engine.

14. The computer-implemented method of claim 5, further comprising:
operating a shared reference clock on the host device that is able to be referenced by a plurality of child virtual rendering engines on the host device.

15. A system, comprising:

at least one processor; and memory including instructions that, when executed by the at least one processor, cause the storage device to:

receive a request for content to be transmitted to a client device;

determine that a first subset of the content has been rendered by a first virtual rendering engine;

provide the first subset of the content to the client device as rendered by the first virtual rendering engine;

determine that a second subset of the content has yet to be rendered;

cause a second virtual engine to render the second subset of the content;

provide the second subset of the content to the client device as rendered by the second virtual rendering engine.

16. The system of claim 15, wherein the instructions, when executed, further cause the system to:

maintain a tree structure for a page including the content, the tree structure indicating the first virtual rendering engine as a parent node associated with primary content for the page, the second virtual rendering engine as a child node associated with unique content for the second subset of the page provided to the client device, and location information for the first and second subsets as rendered by the first and second virtual rendering engines.

17. The system of claim 16, wherein the instructions, when executed, further cause the system to:

receive a subsequent request for the page, the subsequent request associated with a second client device and causing different content to be included for a second portion of the page;

reference a first portion of the content already rendered by at least one of the first virtual rendering engine or the second virtual rendering engine according to the tree structure, wherein the first portion does not need to be re-rendered for the second client device;

render the second portion of the content using a dedicated virtual rendering engine for the second client device; and update the tree structure to include the second portion of the content as rendered by the dedicated virtual rendering engine.

18. The system of claim 15, wherein the first virtual rendering engine is a backing rendering engine for a plurality of child virtual rendering engines, the child rendering engines configured to reference content rendered by the backing rendering engine, wherein each child virtual rendering engine maintains state information for a respective client device.

19. The system of claim 15, further comprising:

a service endpoint configured to function as a proxy for the virtual rendering engines and establish connections between the client devices and the virtual rendering engines.

20. The system of claim 16, wherein the instructions, when executed, further cause the system to:

determine that a new version of the content rendered by the first virtual rendering engine is to be rendered;

cause the new version of the content to be rendered by the first virtual rendering engine; and generate a new tree structure corresponding to the new version.

* * * * *